United States Patent [19]
Bishop

[11] 3,787,846
[45] Jan. 22, 1974

[54] CLOSE-IN RANGER SYSTEM
[75] Inventor: Wilson P. Bishop, Ednor, Md.
[73] Assignee: The United States of America as represented by the Secretary of the Navy, Washington, D.C.
[22] Filed: Aug. 10, 1972
[21] Appl. No.: 279,551

[52] U.S. Cl. ............................... 343/7.3, 343/13 R
[51] Int. Cl. .............................................. G01s 9/14
[58] Field of Search ................. 343/6.5 R, 7.3, 13 R

[56] References Cited
UNITED STATES PATENTS
| | | | |
|---|---|---|---|
| 3,302,199 | 1/1967 | Kelly et al. | 343/7.3 |
| 3,038,142 | 6/1962 | Wippert et al. | 343/13 R X |
| 3,242,489 | 3/1966 | Leyde | 343/7.3 |

*Primary Examiner*—T. H. Tubbesing
*Attorney, Agent, or Firm*—Richard S. Sciascia, J. W. Pease; J. F. Miller

[57] ABSTRACT

A range measuring system wherein a transponder at a remote location is interrogated by coded signals from a base location. If the interrogation is correctly coded the transponder replies. Receipt of a correct reply interrupts the generation of a ramp voltage at the base location. The ramp voltage is measured to determine the range from the base to the transponder. Novel circuitry including a ramp current generator, selectively variable impedance input range switch means, a selectively variable initial voltage ramp set range switch means, shaper gate means and a timer with pulse repetition frequency gate means, is provided to obtain superior accuracy in range measurements.

7 Claims, 3 Drawing Figures

CLOSE-IN RANGER SYSTEM

BACKGROUND OF THE INVENTION

The invention is in the field of electronic range determination. In the prior art various devices have been developed, e.g. radar and sonar apparatus, for determining the range to a distant object. Most of the prior art devices have suffered from various deficiencies, e.g. excessive bulk, weight, cost, lack of reliability, accuracy, and effectiveness. The invention overcomes many of the problems of prior art by providing simple and highly accurate circuitry for range determination which is relatively immune to interference and other problems which restricted the effectiveness of earlier apparatus. The invention provides accurate range measurements at very close ranges, much closer than can be accurately measured with prior art devices.

SUMMARY OF THE INVENTION

The invention is an airborne ranger system for accurately detecting the range to a predetermined target location using pulses transmitted from the target location by a transponder unit which is interrogated by a search aircraft. More specifically, the system comprises a source of clock pulses which initiates transponder interrogation transmission from the aircraft and the production of a ramp voltage signal which is terminated upon receipt of a valid reply pulse from the transponder. The magnitude attained by the ramp voltage is a measure of the unknown range from the aircraft to the target location. Novel circuitry including variable voltage input means and variable initial ramp voltage set means enables accurate measurements to be made at very close ranges.

One object of the invention is to provide accurate range measurement to a designated target from several miles down to zero range.

Another object is to use leading edge tracking on pulses as opposed to conventional pulse power averaging techniques to minimize multipath contamination.

Another object is simplicity to increase reliability, and to minimize bulk and cost.

Another object is to operate accurately in an environment of interfering signals.

DESCRIPTION OF THE PREFERRED EMBODIMENT

Figure 1:
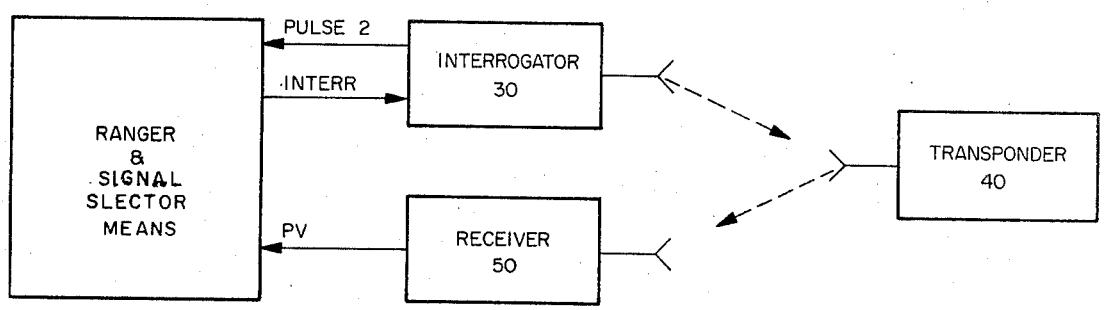
FIG. 1 is a block diagram showing the arrangement of major elements of the invention.

The system block diagram of FIG. 1 shows the arrangement of the basic components of the invention. Ranger 20 initiates the interrogation command which triggers an interrogator 30. The interrogator transmits a time-coded pair of RF pulses to a transponder 40 at a target site. The transponder replies with a single RF pulse (only if the coding is correct). A receiver 50 passes this detected pulse to a PRF gate which screens undesired signals. The output of the PRF gate is used by the ranger. This operation is repeated at a pulse repetition frequency (PRF) of about 1,000 c.p.s. The time reference for measurement is the start of the second pulse transmitted by the interrogator.

Figure 2:
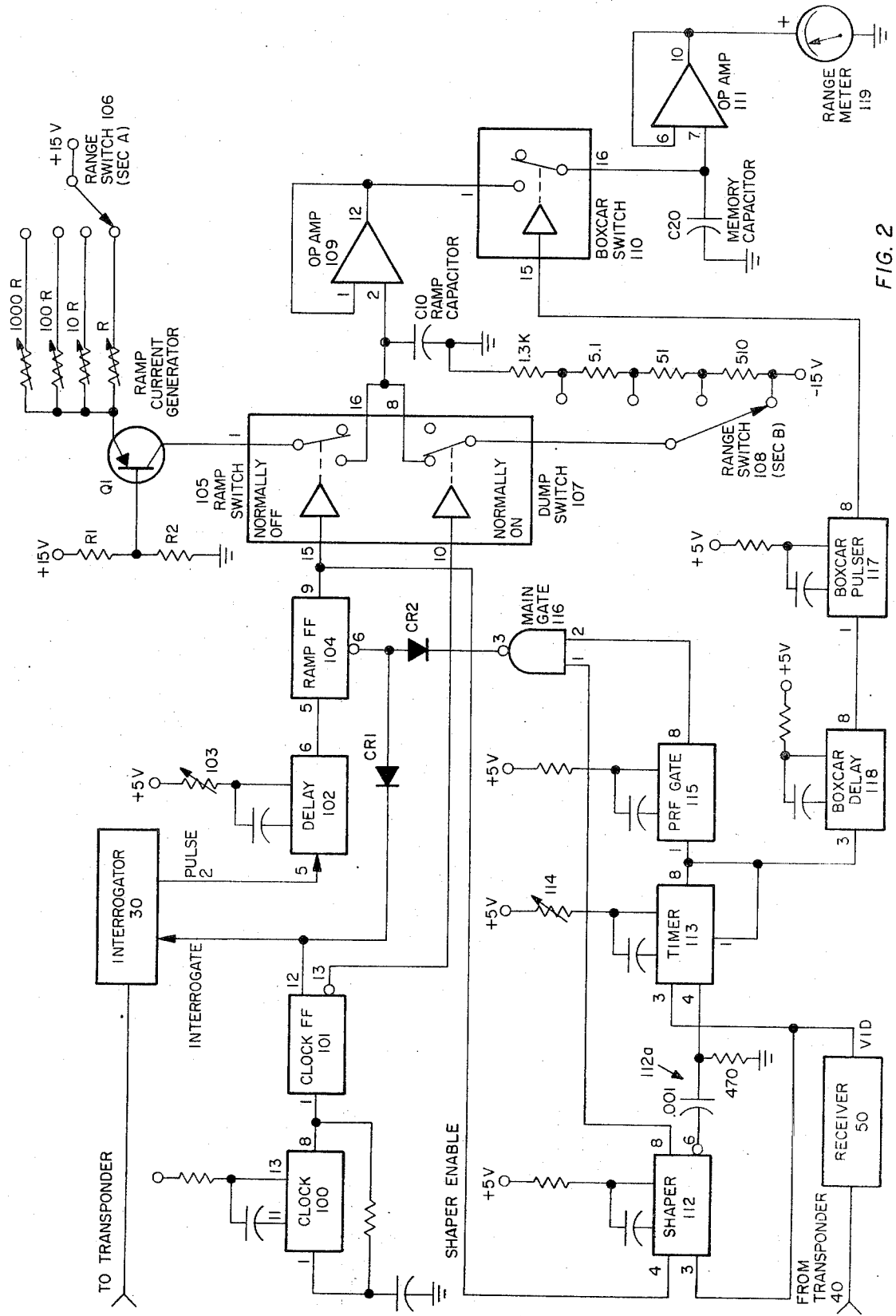
FIG. 2 is a circuit diagram of the invention.
Figure 3:
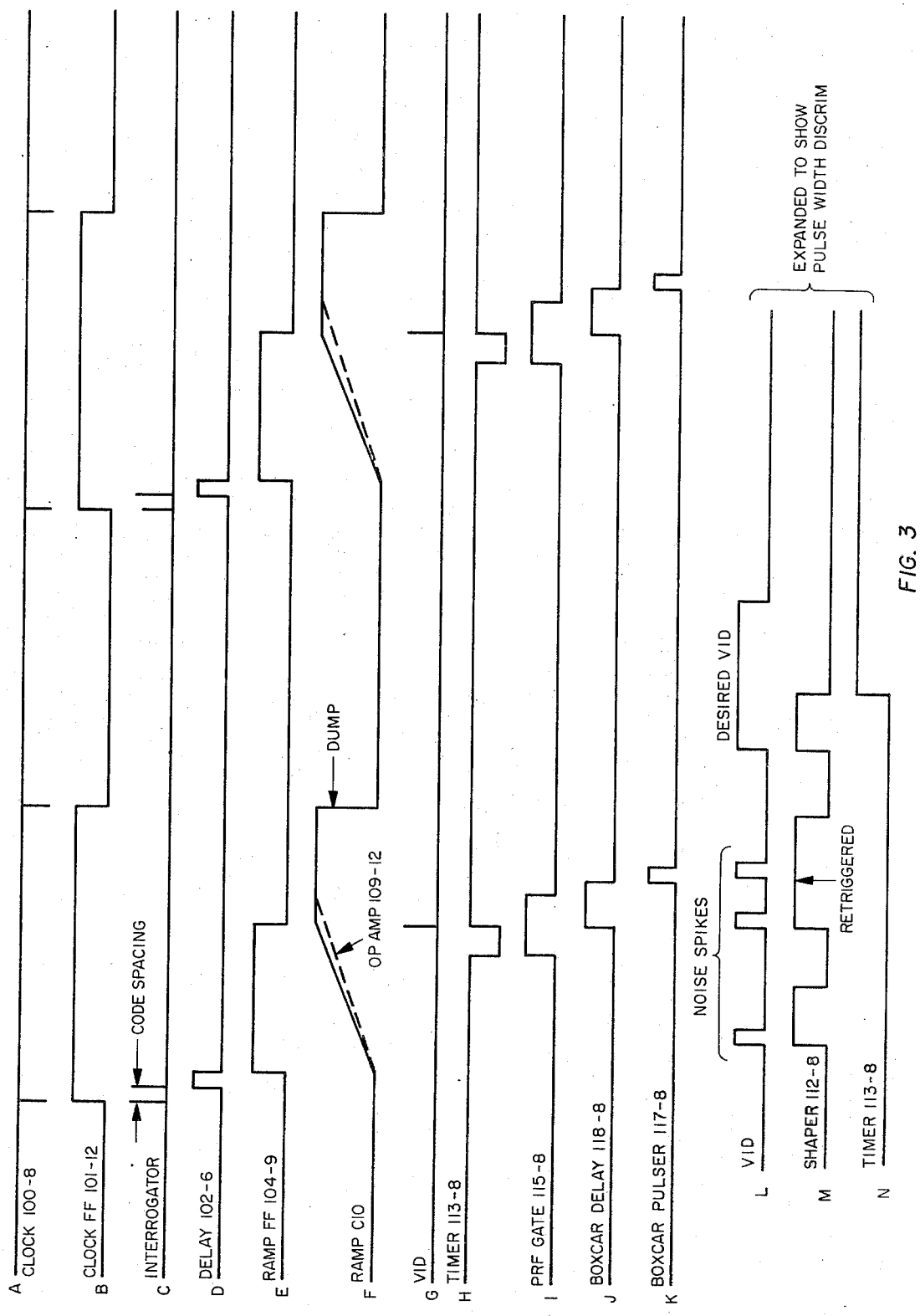
FIG. 3 is a diagram of various timing waveforms useful in describing the operation of the circuitry of FIG. 2.

Referring now to the circuit of FIG. 2 and the waveforms of FIG. 3, FIG. 2 action is initiated by a free-running clock 100 and a clock flip-flop 101. (See waveforms A and B of FIG. 3) In FIG. 3 the waveform legends such as 100–8 and 101–12 refer to pin 8 of clock 100 and pin 12 of clock flip-flop 101 as indicated by the small numbers 8 and 12 adjacent boxes 100 and 101 in FIG. 2. The clock frequency is set by the RC network at pins 11 and 13. The RC network from pins 8 to 1 causes self triggering and determines the pulse width for clock 100. The interrogator 30 is triggered by the Q output (pin 12) of the clock flip-flop. The interrogation is a double-pulse code transmitted to a transponder at the target site. (See waveform C) The second pulse from the interrogator is used as a time reference for measuring range (delay of VID). A delay one-shot 102 is triggered by pulse 2 (see waveform D) and is adjusted by a trimpot 103 to match the combined fixed delays of the transponder and the receiver. This provides the zero range meter calibration. A ramp is started at the termination of this delay and continues until VID occurs. (See waveform F) A ramp flip-flop 104 is set at pin 5 when the delay terminates, and is normally reset at pin 6 by gated VID via a diode CR2. (See waveform E) The ramp flip-flop controls the ramp timing. Clock 100, clock FF (flip-flop) 101, delay 102 and ramp FF 104 constitute a timing circuit of the ranger circuit. If VID is missed, the ramp flip-flop is guaranteed a reset via CR1 when the Q output of the clock flip-flop 101 goes low. The ramp current generator comprises a transistor constant current source Q1 and a ramp capacitor C10 which charges linearly toward + 11v as set by the resistive divider R1, R2 at the base of transistor Q1. The constant current to C10 is selected in decades by section A of a range switch 106. The switch is shown in the lowest range position which prodices a linear ramp of 50 volts/μs. C10 is held at its starting voltage by a dump switch 107 until interrogation is made. The Q output (pin 13) of the clock flip-flop 101 goes low to open the dump switch and releases the hold on C10. When the output (pin 9) of the ramp flip-flop 104 is high the ramp switch 105 is switched on to supply the charging current to C10. C10 charges linearly from its starting voltage and is stopped by the gated VID pulse. The starting voltage is controlled by section B of a range switch 108. This voltage is set to provide 0.1 μs of ramp time before reaching zero range voltage. Zero range occurs at −10v, and full range occurs at +10v. In low range the ramp starts at −15v and reaches −10v in 0.1μs. In the second range, with one tenth of the slope, the ramp starts at −10.5v to reach −10v in 0.1μs. The starting voltage for range 3 is −10.05v, and for range 4 it is essentially −10v.

The VID pulse from the receiver 50 is checked for pulse-width (to guard against receiver noise), and must pass the PRF gate (to guard against interfering signals) before stopping the ramp. Pulse-width discrimination is made by a shaper one-shot 112 which is timed for a 0.2μs pulse (see waveform M of FIG. 3). Noise spikes from the receiver (see waveform L) will be less than 0.2μs, whereas the VID pulse width will exceed 0.2μs. The shaper 112 is enabled at pin 4 only during the ramp time to decrease PRF gate activity from interference. The VID pulse from the receiver triggers the shaper 112 at pin 3 and enables the timer one-shot 113 at pin 3 (see waveforms H and N). The timer is triggered at pin 4 by the trailing edge of the Q shaper pulse (pin 6) via the differentiating capacitor and resistor circuit 112a only if the VID pulse remains until the shaper times out. The timer 113 is used to trigger and center the 1 percent PRF gate 115 for the next VID pulse (see waveform I). Trimpot 114 provides the centering adjustment. The timer is self inhibited by connecting pin 8 to pin 1 so that VID pulses resulting from interference will not retrigger the timer and extend the timing interval. The main gate 116 passes the shaper pulse at pin 1 if it is within the PRF gate interval at pin 2. Successful gating resets the ramp flip-flop 104 via CR2. The main gate 116, shaper 112, timer 113 and PRF gate 115 thus constitute a signal selector means to prevent noise and interference signals from deactivating ramp FF 104.

When the ramp is stopped, the range voltage of interest is temporarily stored at C10. A sample and hold boxcar is used to transfer this voltage to a memory capacitor C20 for the range meter 119. An operation amplifier 109 is connected as a voltage follower to provide the drive current required to update the memory capacitor C20. A boxcar switch 110 passes this current as commanded by a boxcar pulser 117 (see waveform K). Boxcar activity is commanded by the timer 113 and therefore, is governed by pulse width discrimination. A boxcar delay one-shot 118 delays the triggering of the boxcar pulser 117 for about 50µs (see waveform J). This delay is necessary to allow setting time for op amp 109 which is slew rate limited and cannot follow the low range ramp of 50 v/µs (see waveform F). Memory capacitor C20 holds the range voltage between samples. An operational amplifier 111 provides current drive to the range meter 119 while offering a high impedance to C20.

This ranger uses leading edge tracking of the received VID pulse so that multipath effects of the signal are minimized. Accurate range measurements may be made with any two consecutive VID pulses. This may be advantageous in applications where radio silence is important.

This ranger was designed to operate in conjunction with a passive angle receiver which provides the directional information for locating the target. It could be adapted easily to provide a blind landing capability for aircraft with a minimum of equipment. A transponder at each end of a runway could be interrogated alternately as needed. An oscilloscope displaying range vertically, relative bearing horizontally, and intensified by the received pulses could paint a realistic map of the runway in use.

What is claimed is:

1. In a range measuring system, the improvement comprising:
  a. a ranger and signal selector means,
  b. an interrogator connected to said ranger means to receive an interrogation command signal and to transmit time-coded radio frequency pulses,
  c. a transponder responsive to said time-coded pulses to transmit a returning radio frequency pulse,
  d. a receiver for receiving said radio frequency pulse and developing a video pulse output,
  e. said ranger including a ramp capacitor, a ramp current generator for charging said ramp capacitor, ramp switch means connecting said ramp generator and capacitor, and a timing circuit means for producing said itnerrogation command and for actuating said ramp switch means to begin charging said ramp capacitor,
  f. said signal selector means being connected to said receiver and to said timing circuit means to interrupt the charging of said ramp capacitor when a video signal output is developed from said receiver,
  g. said signal selector means including a main AND gate, shaper means for excluding noise spike signals and time and pulse repetition frequency gate means for excluding interference signals, said shaper and pulse repetition frequency gate being connected through said main AND gate to said timing circuit means.

2. Apparatus according to claim 1, said timing circuit means including:
  a. a clock having frequency adjustment RC network means and an output pulse width adjustment RC network means,
  b. a clock flip-flop circuit,
  c. a ramp flip-flop connected to actuate said ramp switch, and
  d. an adjustable delay circuit means connected to receive a pulse from said interrogator and to pass a delayed pulse to said ramp flip-flop, said delay being set to match the combined inherent fixed delays of said transponder and receiver circuits.

3. Apparatus according to claim 2 including:
  a. a range switch for connecting said ramp current generator to a source of voltage and having selective impedance means for varying the sensitivity of said ranger circuit for application to different range measurements,
  b. a normally closed dump switch,
  c. an additional range switch with additional selective impedance means,
  d. said dump switch, range switch and additional impedance means being connected in series between opposite sides of said ramp capacitor to vary the initial charged condition thereof and thereby vary sensitivity of said range circuit to obtain improved range measurements.

4. Apparatus according to claim 3, said range circuit including a range meter, an operational amplifier, a memory capacitor connected to sample said ramp capacitor voltage via said operational amplifier and hold the range voltage on said meter between samples and boxcar delay, pulser and switch means connected to said timer and to said ramp and memory capacitor to time the sampling of said ramp capacitor allowing setting time for said operational amplifier.

5. Apparatus according to claim 1, including:
a range switch for connecting said ramp current generator to a source of voltage and having selective impedance means for varying the sensitivity of said ranger circuit for application to different range measurements and thereby obtain improved range measurements.

6. Apparatus according to claim 5 including:
  a. a normally closed dump switch,
  b. an additional range switch with additional selective impedance means,
  c. said dump switch, range switch and additional impedance means being connected in series between opposite sides of said ramp capacitor to vary the initial charged condition thereof and thereby vary sensitivity of said range circuit to obtain improved range measurements.

7. Apparatus according to claim 1, including:
a. a normally closed dump switch,
b. an additional range switch with additional selective impedance means,
c. said dump switch, range switch and additional impedance means being connected in series between opposite sides of said ramp capacitor to vary the initial charged condition thereof and thereby vary sensitivity of said range circuit to obtain improved range measurements.

* * * * *